US010070388B2

(12) United States Patent
Chirikov et al.

(10) Patent No.: US 10,070,388 B2
(45) Date of Patent: Sep. 4, 2018

(54) COORDINATED DUTY CYCLE ASSIGNMENT IN MESH NETWORKS

(71) Applicant: Telefonaktiebolaget LM Ericsson (publ), Stockholm (SE)

(72) Inventors: Roman Chirikov, Stockholm (SE); Piergiuseppe Di Marco, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 107 days.

(21) Appl. No.: 15/031,218

(22) PCT Filed: Mar. 14, 2016

(86) PCT No.: PCT/SE2016/050205
§ 371 (c)(1),
(2) Date: Apr. 21, 2016

(87) PCT Pub. No.: WO2016/178612
PCT Pub. Date: Nov. 10, 2016

(65) Prior Publication Data
US 2017/0105178 A1    Apr. 13, 2017

Related U.S. Application Data

(60) Provisional application No. 62/156,641, filed on May 4, 2015.

(51) Int. Cl.
*H04W 24/00* (2009.01)
*H04W 52/02* (2009.01)
(Continued)

(52) U.S. Cl.
CPC ..... *H04W 52/0232* (2013.01); *H04W 40/248* (2013.01); *H04W 84/18* (2013.01)

(58) Field of Classification Search
CPC .......... H04W 52/0232; H04W 40/248; H04W 84/18; H04W 52/02; H04W 40/24; H04W 80/04; H04W 24/00
See application file for complete search history.

(56) References Cited

U.S. PATENT DOCUMENTS

2003/0148800 A1* 8/2003 Lee ...................... H04B 1/1615
455/574
2006/0120303 A1* 6/2006 Yarvis ..................... H04L 12/12
370/254
(Continued)

FOREIGN PATENT DOCUMENTS

GB             2455771 A      6/2009
WO        2010030952 A2      3/2010

*Primary Examiner* — Andrew Lee
(74) *Attorney, Agent, or Firm* — Murphy, Bilak & Homiller, PLLC

(57) ABSTRACT

In one aspect, a node in a mesh network receives presence messages from neighbor node in the mesh network, and determines a number of neighbor nodes, based on the received presence messages. The node determines a duty cycle percentage to be requested of the neighbor nodes, based on the number of the neighbor nodes, the duty cycle percentage indicating a minimum percentage of time the neighbor nodes should be awake to receive messages, so as to ensure a predetermined probability of successful reception of messages transmitted by the node. The node broadcasts the duty cycle percentage for reception by the neighbor nodes. The node also receives requested duty cycle percentages from corresponding neighbor nodes, sets an operating duty cycle of the node based on a greatest duty cycle percentage of the received duty cycle percentages, and sleeps and wakes according to the set duty cycle of the node.

28 Claims, 12 Drawing Sheets

(51) Int. Cl.
*H04W 40/24* (2009.01)
*H04W 84/18* (2009.01)

(56) References Cited

U.S. PATENT DOCUMENTS

| | | | |
|---|---|---|---|
| 2007/0162582 A1* | 7/2007 | Belali | G06F 1/3209 709/223 |
| 2009/0046611 A1* | 2/2009 | Ryu | H04W 52/0216 370/311 |
| 2009/0078350 A1* | 3/2009 | Ohashi | B60C 11/12 152/209.18 |
| 2009/0213821 A1 | 8/2009 | Fonseca, Jr. et al. | |
| 2012/0134280 A1* | 5/2012 | Rotvold | H04B 17/24 370/252 |
| 2013/0013806 A1* | 1/2013 | Woo | H04L 5/06 709/238 |
| 2013/0106616 A1* | 5/2013 | Gustafsson | H04Q 9/00 340/870.02 |
| 2014/0376430 A1* | 12/2014 | Su | H04W 52/0212 370/311 |
| 2014/0379480 A1* | 12/2014 | Rao | G06F 8/00 705/14.58 |
| 2015/0190626 A1* | 7/2015 | Colman | A61M 39/1011 285/9.1 |
| 2015/0341874 A1* | 11/2015 | Nguyen-Dang | H04W 52/0209 370/350 |

\* cited by examiner

COORDINATED DUTY CYCLE ASSIGNMENT IN MESH NETWORKS

TECHNICAL FIELD

The present invention generally relates to wireless communication networks, and particularly relates to duty cycles of nodes in a mesh network.

BACKGROUND

Mesh network topologies are used by low power wireless communication technologies to increase their coverage and flexibility. Such technologies require nodes of the mesh network to act as forwarders of packets or messages. As a result, a packet from a source may reach its destination via several other nodes that each receive and retransmit the packet.

A simple and straightforward way to perform retransmissions is for every node that receives a transmission to broadcast the packet, but with a restriction on the number of transmissions in order to avoid loops with infinite retransmissions. This technique, called flooding, is used widely in computer networking and has been proposed to support mesh networking for wireless solutions, such as for Bluetooth® Low Energy (BLE) solutions. Flooding requires no routing information or scheduling, and it is very tolerant of changes in the topology.

It is recognized herein that a drawback of flooding is that for a packet to be propagated through the network, nodes have to be awake and ready to receive and transmit. This can require a high duty cycle that drains the battery of low power devices. Another drawback is the high probability that packet collisions and losses will occur when many devices broadcast at the same time. Scheduling of transmissions can help to solve this problem, but it reduces the flexibility of the network and requires additional synchronization information to be spread and stored.

Furthermore, flooding is designed to spread information over all nodes in the network. When it is used as a means of point-to-point communication, the network quickly becomes over-utilized, since a small number of relays may be sufficient to guarantee correct reception of the information.

Routing is another way of delivering packets through multi-hop networks. Routing implies unicast transmissions between nodes along the route from source to destination. Therefore, routing requires source nodes to be able to find routes towards a destination node, to choose one of the routes according to some metrics and conditions, and to encapsulate routing information into the packet (either specifying each node along the route or using an addressing system). However, it is recognized herein that routing challenges a node's hardware in terms of memory and processing power. In order to define routes and to judge route performance, it is necessary to obtain, spread and update information about nodes across the network. This makes routing complicated, and routing is not always a practical solution for low-power mesh networks.

SUMMARY

Embodiments of the present invention comprise apparatuses and methods for optimizing and coordinating duty cycles of nodes in a mesh network. The duty cycle of a node is a cycle defined by a wake period and a sleep period of a node. The node is able to transmit and receive packets only if awake, and the node turns off its radio transceiver while sleeping, to reduce energy consumption. The duty cycle of a node can be characterized by two parameters: a duty cycle period that indicates the time interval between consecutive wake-up instances for the device, and a duty cycle percentage that indicates the percentage of time the device is awake during a duty cycle period.

In contrast to conventional methods of flooding, or spreading messages through the mesh network, the embodiments described herein can be used to minimize the energy consumption of nodes while expecting that messages will reach their destination with a predetermined probability of success. The determination of a duty cycle for a given device depends on the density of the network in the vicinity of the device. The more devices that are reachable by a given node, the lower the duty cycle needed for those devices to expect that at least one of them can be reached at any time. To that end, neighbor discovery and duty cycle request procedures are described.

According to some embodiments, a node may determine a duty cycle percentage to be requested of neighbor nodes and share the requested percentage with neighbor nodes. Such a method by a node of a mesh network includes receiving a presence message from each of one or more neighbor nodes in the mesh network. The method also includes determining a number of neighbor nodes, based on the received presence messages. The nodes counted in the number of the neighbor nodes may only be the nodes that can receive and forward messages to at least one node other than the requesting node. The method also includes determining a duty cycle percentage to be requested of the neighbor nodes, based on the number of the neighbor nodes, the duty cycle percentage indicating a minimum percentage of time the neighbor nodes should be awake to receive messages so as to ensure a predetermined probability of successful reception of messages transmitted by the node. The method further includes broadcasting the duty cycle percentage for reception by the neighbor nodes. Although the broadcast may be received by other nodes, the broadcast is intended for the neighbor nodes that sent the presence messages received by the node.

In other embodiments, a node may set its own operating duty cycle percentage based on duty cycles percentages requested by the neighboring nodes. For example, a method includes receiving one or more requested duty cycle percentages from one or more corresponding neighbor nodes, setting an operating duty cycle of the node based on a greatest duty cycle percentage of the received duty cycle percentages, and sleeping and waking according to the set duty cycle of the node.

According to some embodiments, a method, by a node of a mesh network spreading information to other nodes according to a duty cycle defined by a duty cycle period and a duty cycle percentage, includes receiving presence messages from neighbor nodes in the mesh network and determining a number of neighbor nodes, based on the received presence messages. The method also includes determining a duty cycle percentage to be requested of neighbor nodes, based on the number of neighbors, the duty cycle percentage indicating a minimum percentage of time the neighbor nodes should be awake to receive messages, so as to ensure a predetermined probability of successful reception of messages transmitted by the node. The method also includes broadcasting the duty cycle percentage for reception by the neighbor nodes, receiving one or more requested duty cycle percentages from one or more corresponding neighbor nodes and setting the duty cycle of the node based on a greatest duty cycle percentage of the received duty cycle percentages. The method further includes sleeping and waking according to the set duty cycle of the node.

In some embodiments, a method may include the steps of both methods. In some embodiments, a node may perform either method or both methods.

According to some embodiments, a node of a mesh network of wireless devices includes a transceiver circuit and a processing circuit. The transceiver circuit is configured to receive a presence message from each of one or more neighbor nodes in the mesh network. The processing circuit is configured to determine a number of neighbor nodes, based on the received presence messages. The processing circuit is also configured to determine a duty cycle percentage to be requested of the neighbor nodes, based on the number of the neighbor nodes. The duty cycle percentage indicates a minimum percentage of time the neighbor nodes should be awake to receive messages, so as to ensure a predetermined probability of successful reception of messages transmitted by the node. The processing circuit is configured to broadcast, via the transceiver, the duty cycle percentage for reception by the neighbor nodes.

According to some embodiments, a node of a mesh network of wireless devices includes a transceiver circuit and a processing circuit. The transceiver circuit is configured to receive one or more requested duty cycle percentages from one or more corresponding neighbor nodes. The processing circuit is configured to set an operating duty cycle of the node based on a greatest duty cycle percentage of the received duty cycle percentages, and sleep and wake according to the set duty cycle of the node.

According to some embodiments, a node of a mesh network of wireless devices includes a transceiver circuit and a processing circuit. The transceiver circuit is configured to receive presence messages from neighbor nodes in the mesh network. The processing circuit is configured to determine a number of neighbor nodes, based on the received presence messages, and determine a duty cycle percentage to be requested of neighbor nodes, based on the number of neighbors. The duty cycle percentage indicates a minimum percentage of time the neighbor nodes should be awake to receive messages, so as to ensure a predetermined probability of successful reception of messages transmitted by the node. The processing circuit is configured to broadcast, via the transceiver, the duty cycle percentage for reception by the neighbor nodes and receive, via the transceiver, one or more requested duty cycle percentages from one or more corresponding neighbor nodes. The processing circuit is also configured to set the duty cycle of the node based on a greatest duty cycle percentage of the received duty cycle percentages and sleep and wake according to the set duty cycle of the node.

Other embodiments include computer program products, computer readable medium and functional module implementations that carry out the methods described above.

Of course, the present invention is not limited to the above features and advantages. Those of ordinary skill in the art will recognize additional features and advantages upon reading the following detailed description, and upon viewing the accompanying drawings.

DETAILED DESCRIPTION

The embodiments described herein provide a way to optimize duty cycles of nodes in a mesh network based on a density of the mesh network. The density of the mesh network at any given point in the network is characterized by how many neighbors of each node at that point can receive and forward messages. The operating duty cycles for neighbors of each node can then be set, based on the number of neighbor nodes, so as to conserve energy while still maintaining a predetermined probability that at least one neighbor node will be awake at any given time to receive and forward a transmission. For example, the minimum required duty cycle percentage for each neighbor node can be shared and a duty cycle percentage can be adopted by each node while maintaining the reliability of the mesh network to forward messages so that all target nodes receive the messages.

Figure 1:
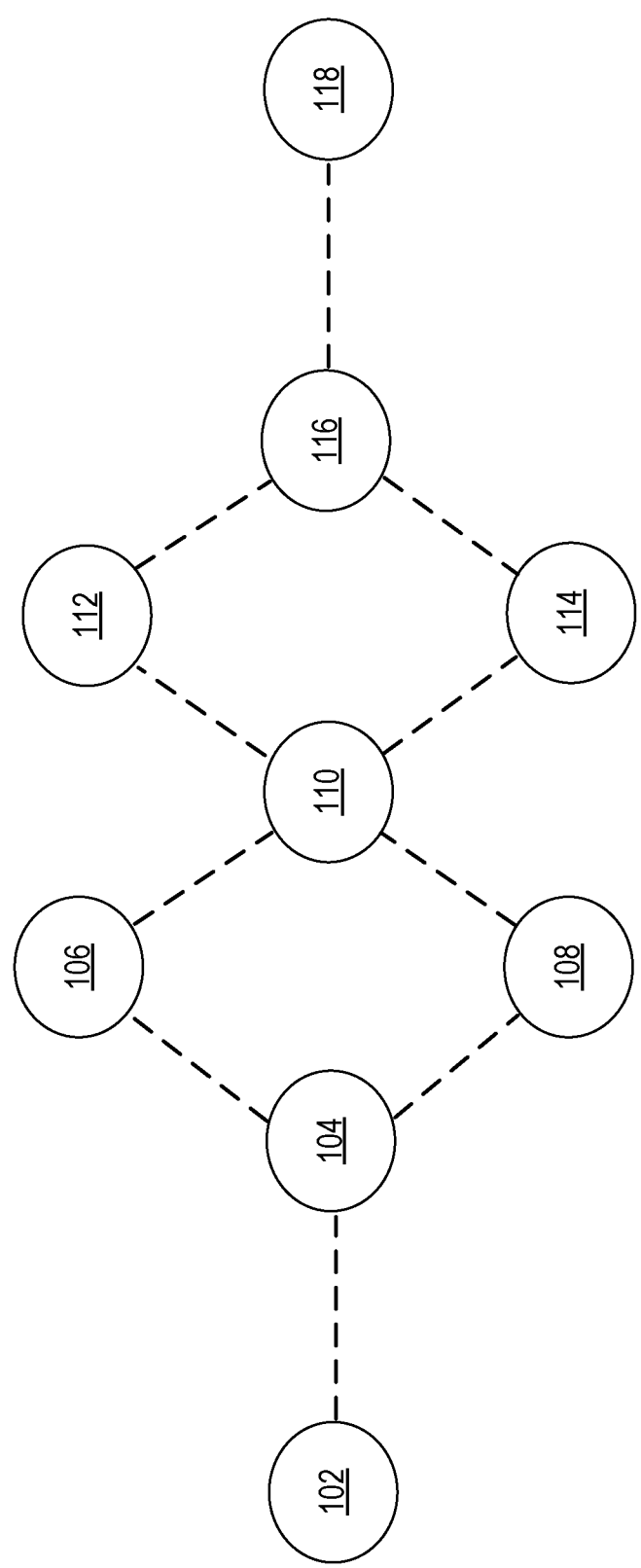
FIG. 1 is a diagram illustrating nodes in a mesh network, according to some embodiments.

A node, according to some embodiments, is capable of transmitting broadcast messages to neighbor nodes and receiving broadcast messages from those neighbor nodes. The node has sufficient computation capability to determine the number of neighbor nodes, request minimum duty cycles from each of its neighbors, based on the number of neighbor nodes, and to set its own duty cycle, based on the required wake time for reception as indicated by requests received from its neighbors. For example, FIG. 1 illustrates a mesh network of nodes 102-118. The node 104 has neighbor nodes 102, 106 and 108, each of which can receive messages from the node 104 and send messages to the node 104. Nodes 106 and 108 can send messages to another node, i.e., node 110, which in turn can exchange messages with any of nodes 106, 108, 112, and 114. In some embodiments, the node 104 sends and receives messages using a low energy protocol, such as a Bluetooth® Low Energy (BLE) or Bluetooth® Smart protocol stack, and possibly using any advertising channels defined in the standard. The techniques disclosed herein are not dependent on the radio technology that is used, however—other radio technologies may be used, in various embodiments of the disclosed techniques and apparatus.

In some embodiments, the duty cycle interval is fixed and set to be shorter than the packet inter-arrival time. At this length, it is ensured that each node is awake at least once every time a packet is ready to be transmitted. Therefore, in this case, the only parameter that the node 104 is able to set autonomously is the duty cycle percentage. If the wake up time elapses while the node 104 is receiving a message, the node 104 may continue to receive the message and go to sleep after the reception is completed.

In some cases, the node 104 needs to keep local time information in order to perform periodic transactions. However, it does not need to keep time synchronization with other nodes in the network. Various embodiments involve nodes in flooding schemes that are not time synchronized, but make sure that the message is received by the target node(s) at an appropriate time. Operations that utilize time will utilize local time information. The embodiments described herein provide for establishing duty cycles, e.g., duty cycle percentages, among the nodes of the mesh network, to better optimize energy efficiency and message flooding reliability.

Figure 2:
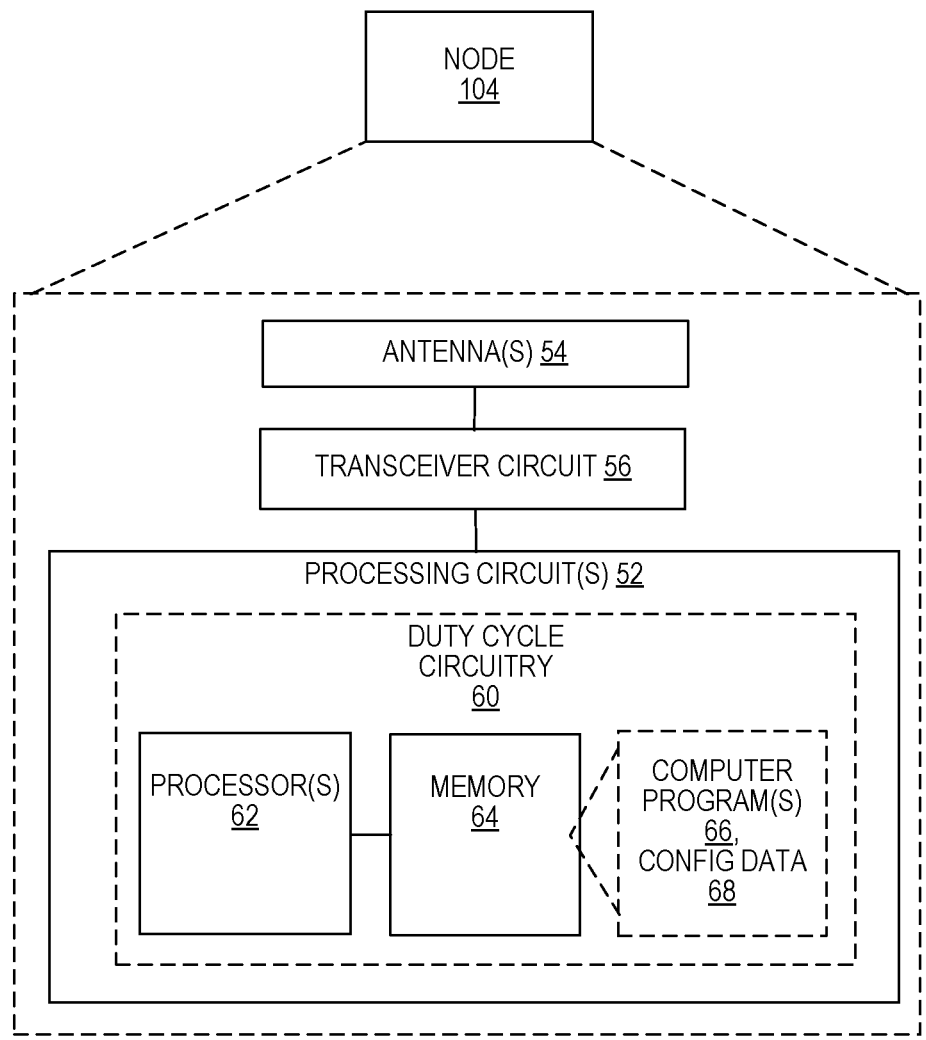
FIG. 2 is a block diagram of a node configured to optimize duty cycles of nodes in the mesh network, according to some embodiments.

FIG. 2 illustrates a diagram of the node 104, according to some embodiments. The node 104 provides an air interface to other wireless devices, e.g., an air interface for transmission and reception, which is implemented via antennas 54 and a transceiver circuit 56. The transceiver circuit 56 may include transmitter circuits, receiver circuits, and associated control circuits that are collectively configured to transmit and receive signals according to a radio access technology, for the purposes of providing communication services. According to various embodiments, communication services may be operated according to any one or more of short range or low energy standards or protocols, such as Bluetooth® protocols, BLE protocols, Bluetooth® Smart protocols or other protocols established by the Bluetooth® Special Interest Group (SIG). In some embodiments, communication services may be operated according to WLAN technologies, such as by IEEE 802.11 or Wi-Fi protocols. According to some embodiments, cellular communication services may be operated according to any one or more of the 3GPP cellular standards, GSM, GPRS, WCDMA, HSDPA, Long Term Evolution (LTE) and LTE-Advanced.

The node 104 also includes one or more processing circuits 52 that are operatively associated with the transceiver circuit 56. The processing circuit 52 comprises one or more digital processors 62, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially configured via the execution of program instructions implementing the functionality taught herein, or may comprise some mix of fixed and programmed circuitry. The processor 62 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from the processing circuit 52.

In general, the memory 64 comprises one or more types of computer-readable storage media providing non-transitory storage of the computer program 66 and any configuration data 68 used by the network node 104. Here, "non-transitory" means permanent, semi-permanent, or at least temporarily persistent storage and encompasses both long-term storage in non-volatile memory and storage in working memory, e.g., for program execution.

The processor 62 of the processing circuit 52 may execute a computer program 46 stored in the memory 64 that configures the processor 62 to determine and broadcast duty cycle percentages. The processor 62 is configured to receive a presence message from each of one or more neighbor nodes in the mesh network. The processor 62 is configured to determine a number of neighbor nodes, based on the received presence messages. The processor 62 is configured to determine a duty cycle percentage to be requested of the neighbor nodes, based on the number of the neighbor nodes. The duty cycle percentage indicates a minimum percentage of time the neighbor nodes should be awake to receive messages. This is to ensure a predetermined probability of successful reception of messages transmitted by the node. The processor 62 is configured to broadcast the duty cycle percentage for reception by the neighbor nodes. This structure and functionality may be referred to as duty cycle circuitry 60 in the processing circuit 52.

Figure 3:
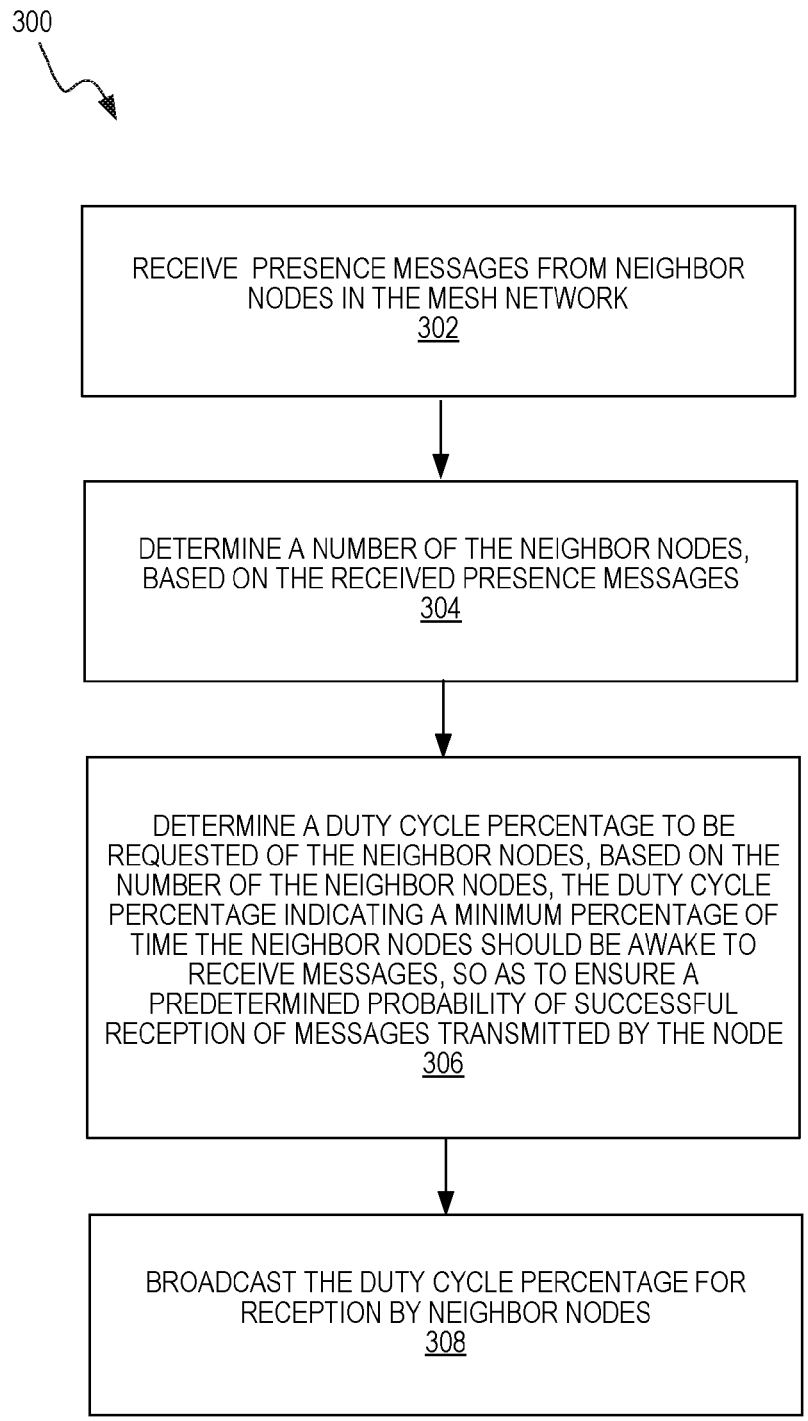
FIG. 3 illustrates a method in a node for determining a duty cycle of a node in the mesh network, according to some embodiments.

In some embodiments, the processing circuit 52 is configured to perform a method for determining and broadcasting a duty cycle percentage with neighbor nodes. For example, FIG. 3 illustrates a method 300 that includes receiving a presence message from each of one or more neighbor nodes in the mesh network (block 302). The messages may be any message that indicates the presence of another node. These may include presence announcement messages (PAMs). In turn, the node can also broadcast its presence to neighbor nodes. In some cases, receiving presence messages includes receiving presence messages during a time period to include all neighbor node duty cycles. If a wake time elapses while receiving a presence message, sleeping can take place after reception of the presence message is completed.

The method also includes determining a number of neighbor nodes, based on the received presence messages (block 304). The node can receive a dead end message from a neighbor node indicating the neighbor node cannot forward messages to another node. As a result, the neighbor node that sent the dead end message is not included in said number of neighbors. In some cases, the number of neighbor nodes can be subtracted by 1, if the number previously included the neighbor node that sent the dead end message.

The method includes determining a duty cycle percentage to be requested of the neighbor nodes, based on the number of the neighbor nodes, the duty cycle percentage indicating a minimum percentage of time the neighbor nodes should be awake to receive messages, so as to ensure a predetermined probability of successful reception of messages transmitted by the node (block 306). The duty cycle percentage can be based on a predetermined number of retransmissions for each message. The duty cycle percentage decreases with an increase in the number of neighbor nodes that can forward messages. Likewise, the duty cycle percentage increases with a decrease in the number of neighbor nodes that can forward messages.

The method also includes broadcasting the duty cycle percentage for reception by the neighbor nodes (block 308). In some cases, broadcasting includes broadcasting, with a random delay, a duty cycle request message (DCR) that comprises the duty cycle percentage. The period of broadcasting can be extended or the number of broadcasts can be increased to ensure that all nodes, or all requesting nodes, receive the duty cycle percentage. For example, broadcasting the duty cycle percentage includes broadcasting during a time period to include all neighbor node duty cycles. This is to make sure that the neighbor nodes receive the broadcast, given the existing or default duty cycles of the neighbor nodes. Broadcasts can use BLE protocols on advertising channels. The method, or some blocks of the method, may take place upon initialization of the network or upon the addition or deletion of a node to the mesh network. The receiving or broadcasting can be performed periodically according to local time information of the node.

In some of these and in other embodiments, the processor 62 of the processing circuit 52 may execute a computer program 66 stored in the memory 64 that configures the processor 62 to receive one or more requested duty cycle percentages from one or more corresponding neighbor nodes and set an operating duty cycle of the node based on a greatest duty cycle percentage of the received duty cycle percentages. The processor 62 can cause the node to sleep and wake according to the set duty cycle of the node. This structure and functionality may also be performed by duty cycle circuitry 60 in the processing circuit 52.

Figure 4:
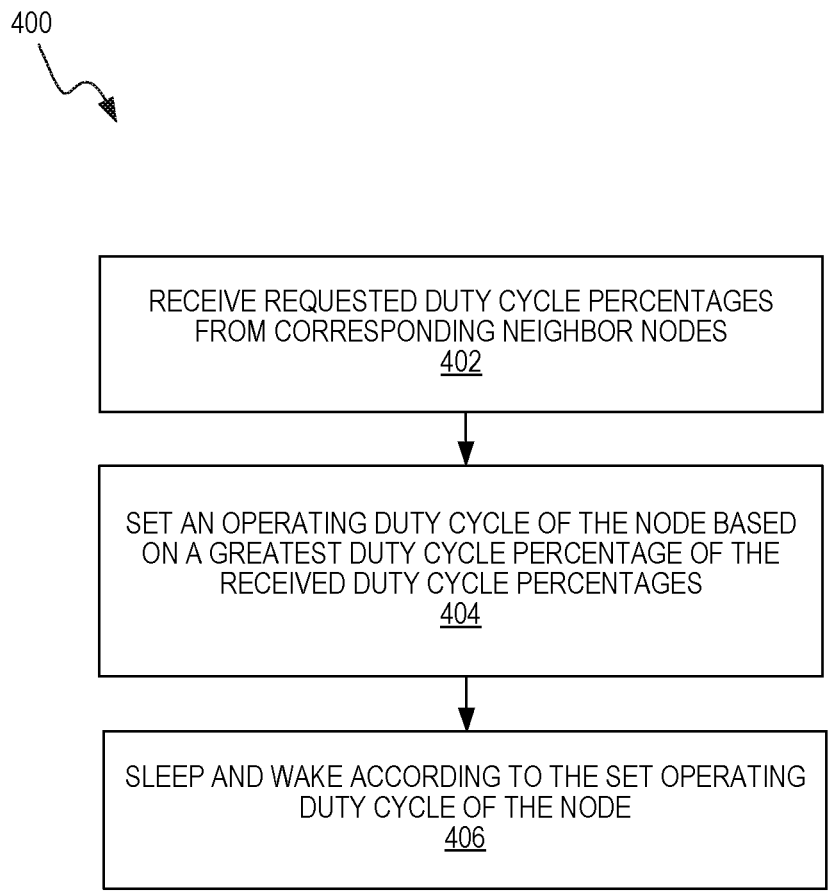
FIG. 4 illustrates a method in a node for setting a duty cycle of a node in the mesh network, according to some embodiments.

In some embodiments, the processing circuit 52 is configured to perform a method for setting a duty cycle. For example, FIG. 4 illustrates a method 400 that includes receiving one or more requested duty cycle percentages from one or more corresponding neighbor nodes (block 402). The method 400 includes setting an operating duty cycle of the node based on a greatest duty cycle percentage of the received duty cycle percentages (block 404) and sleeping and waking according to the set duty cycle of the node (block 406).

Figure 5:
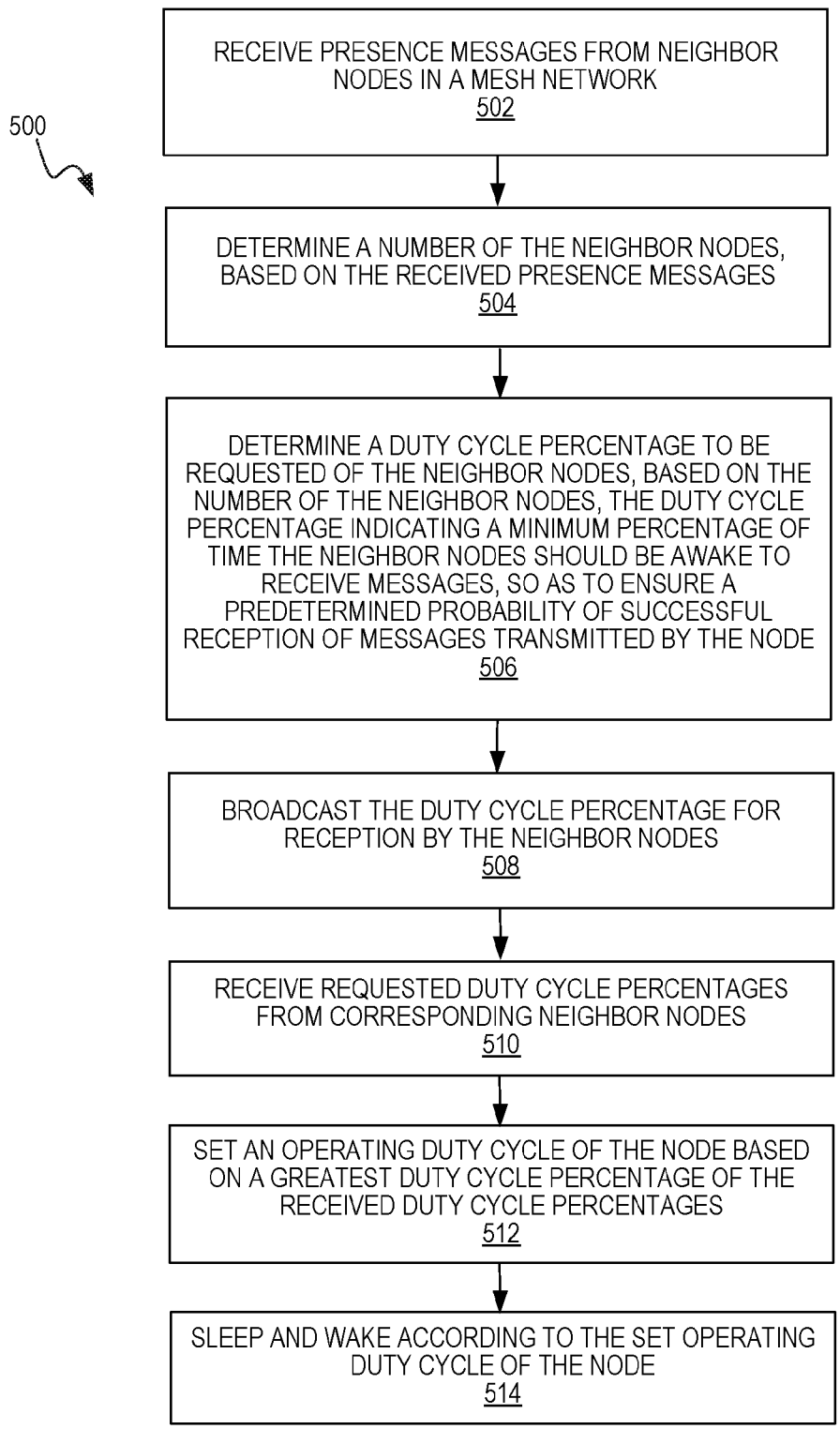
FIG. 5 illustrates a method in a node for optimizing duty cycles of nodes in the mesh network, according to some embodiments.

In some embodiments, processing circuit 52 is configured to perform the operations of method 300 and 400. For example, a method 500 for optimizing duty cycles is illustrated in FIG. 5. The method 500 includes receiving presence messages from neighbor nodes in the mesh network (block 502), determining a number of neighbor nodes, based on the received presence messages (block 504), and determining a duty cycle percentage to be requested of neighbor nodes, based on the number of neighbors, the duty cycle percentage indicating a minimum percentage of time the neighbor nodes should be awake to receive messages, so as to ensure a predetermined probability of successful reception of messages transmitted by the node (block 506). The method 500 also includes broadcasting the duty cycle percentage for reception by the neighbor nodes (block 308). The method 500 further includes receiving one or more requested duty cycle percentages from one or more corresponding neighbor nodes (block 508), setting the duty cycle of the node based on a greatest duty cycle percentage of the received duty cycle percentages (block 510), and sleeping and waking according to the set duty cycle of the node (block 512).

According to some embodiments, a duty cycle coordination process includes: neighbor discovery, dead end notification, neighbor duty cycle estimation, and duty cycle setting. This process may be triggered either during mesh network initialization (when nodes do not have any duty cycle configured), or whenever a new node joins the network (in this case the process can be performed locally for the affected part of the network and initiated by the new node). A mesh network is affected when a node moves within or leaves the mesh network.

Since it is not always possible to announce that a node moves or leaves, a periodical duty cycle coordination process is used to keep the duty cycles updated, in some embodiments. In some cases, the duty cycle coordination process is repeated periodically with a period that is pre-set by the responsible node or entity of the network deployment. The period can be chosen according to the time scale of mobility in the network, for example.

Neighbor discovery involves determining the density of a mesh network. This can include learning or letting nodes know how many neighbor nodes can forward messages (i.e., nodes within their communication range). This can be performed via broadcasting PAMs. During this phase, each node broadcasts its presence announcement and collects similar announcements from every node within its range. That is, the number of neighbors can be estimated by counting the number of distinct presence messages received within a period of time. Each presence message could contain the address of the device, so that consecutive presence messages from the same device are not counted as from different devices.

In order to avoid collision of these announcements, a random limited delay can be introduced before broadcasting of the announcement by each node. This delay also defines how long this procedure lasts.

Dead end notifications are useful when a node has only one neighbor and the neighbor cannot forward packets to any other node. In this case, a node should notify its neighbor that the node or one of its neighbors is a dead end for packets and should not be taken into account for duty cycle calculation. This is done by sending a specific message that may be called a dead end notification (DEN). If a node receives such a message, it decreases its counter of neighbors by one, or does not include the neighbor in a count or number of the neighbor nodes.

Neighbor duty cycle estimation can determine a duty cycle period and/or a duty cycle percentage. In some embodiments, the duty cycle period is fixed or predetermined, so that only duty cycle percentages are determined. When the node knows how many neighbors it has, it computes the minimal duty cycle that they are required to use in order to maintain a predetermined probability that at least one neighbor will always receive a packet transmitted from the node, given a certain number of retransmissions from the node.

In an example, a node has N neighbors with equal duty cycles, or duty cycle percentages D. This may be node 104 with neighbor nodes 102, 106 and 108. The node transmits the same data packet k times. By assuming that node duty cycles are asynchronous and there is an independent probability of being awake in consecutive transmissions, i.e., the interval between retransmissions is longer than the average duty cycle period, then the probability P that at least one of the neighbors is awake at any given time is calculated as follows:

$$P=1-(1-D)^{kN}.$$

Therefore, the required duty cycle percentage D of the neighbors is a function of N and k:

$$D = 1 - \sqrt[kN]{1-P}.$$

Figure 6:
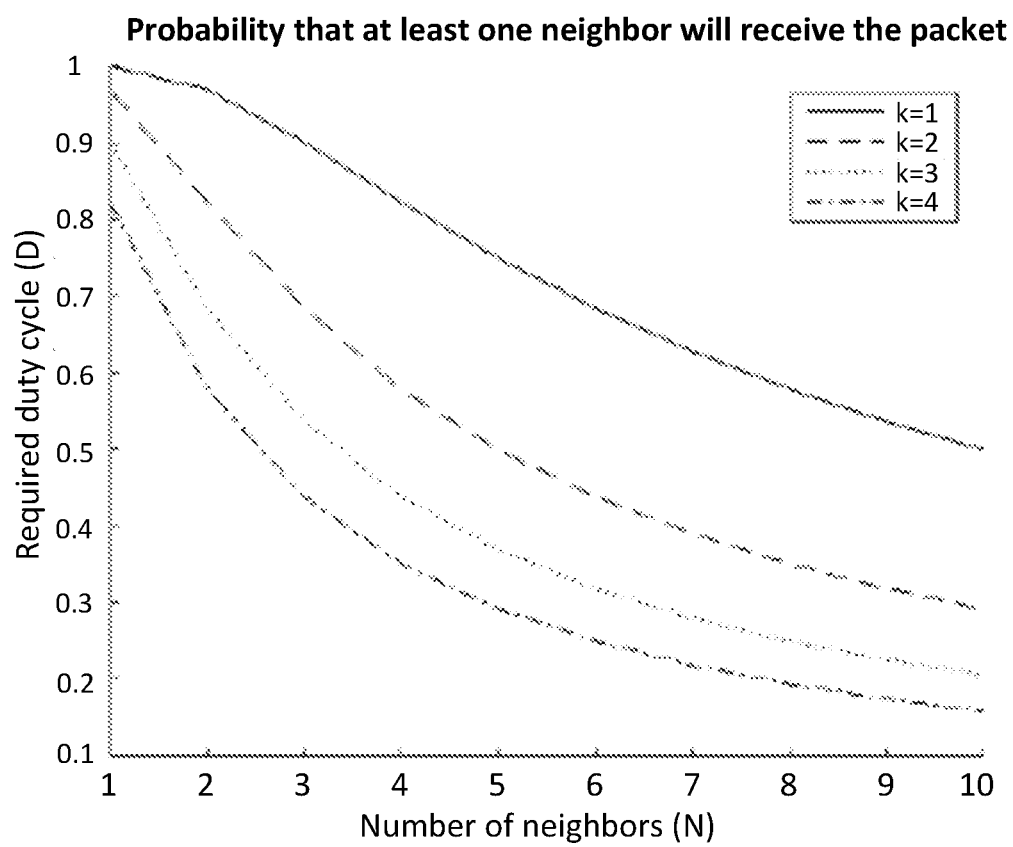
FIG. 6 illustrates a calculated duty cycle as a function of the number of neighbors and the number of retransmissions, according to some embodiments.

The diagram of FIG. 6 also shows this function. In order to keep high network reliability, it may be required that P is 99.9%, in some embodiments. Therefore, in one example, the equation may be:

$$D = 1 - \sqrt[kN]{1-0.999}.$$

FIG. 6 shows the calculated duty cycle percentage D as a function of the number of neighbors and the number of data retransmissions k. The number of retransmissions k depends on the underlying communication technology. In some embodiments, k is fixed and equal for all the nodes. In other embodiments, a node chooses to adjust k based on the number of neighbors and/or a change in the number of neighbors. For example, the node may increase k if it has too few neighbors (N<Nmin). The time interval between retransmissions may also depend on the radio technology used.

The nodes then set their respective duty cycles. After calculating the required duty cycle from neighbors, the node broadcasts, with a random delay, a DCR containing the calculated value. Each node in the network receives one or more duty cycle requests from its neighbors. The requests may contain different values of required duty cycles, or duty cycle percentages.

In some embodiments, in order to provide high reliability, the node picks the biggest value among the received requests. This value is configured as the node's duty cycle percentage. If a node has only one neighbor, it may disregard the duty cycle request, since it cannot forward the packet anyway.

Figure 7:
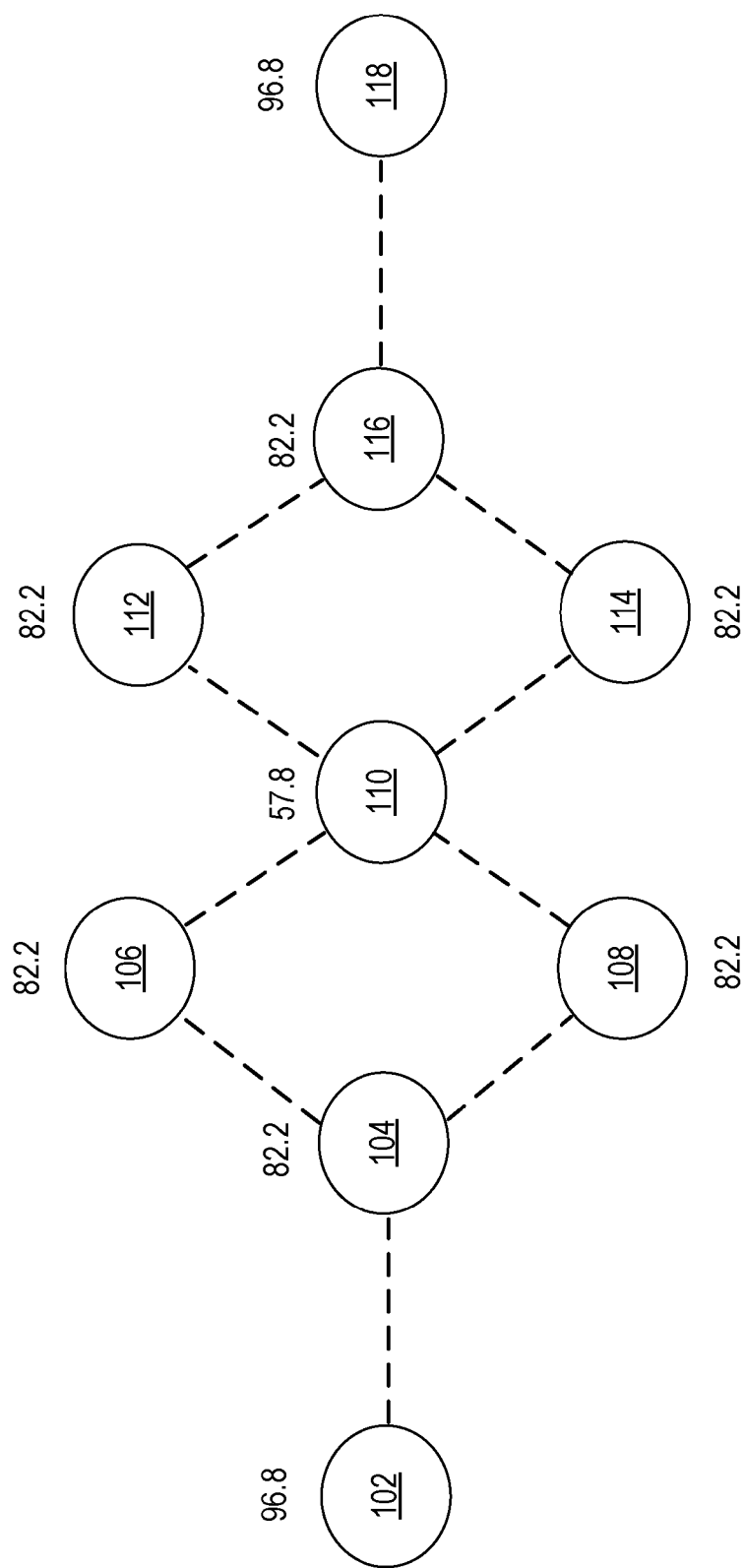
FIG. 7 is a diagram illustrating nodes in a mesh network with determined duty cycle percentages, according to some embodiments.
Figure 8:
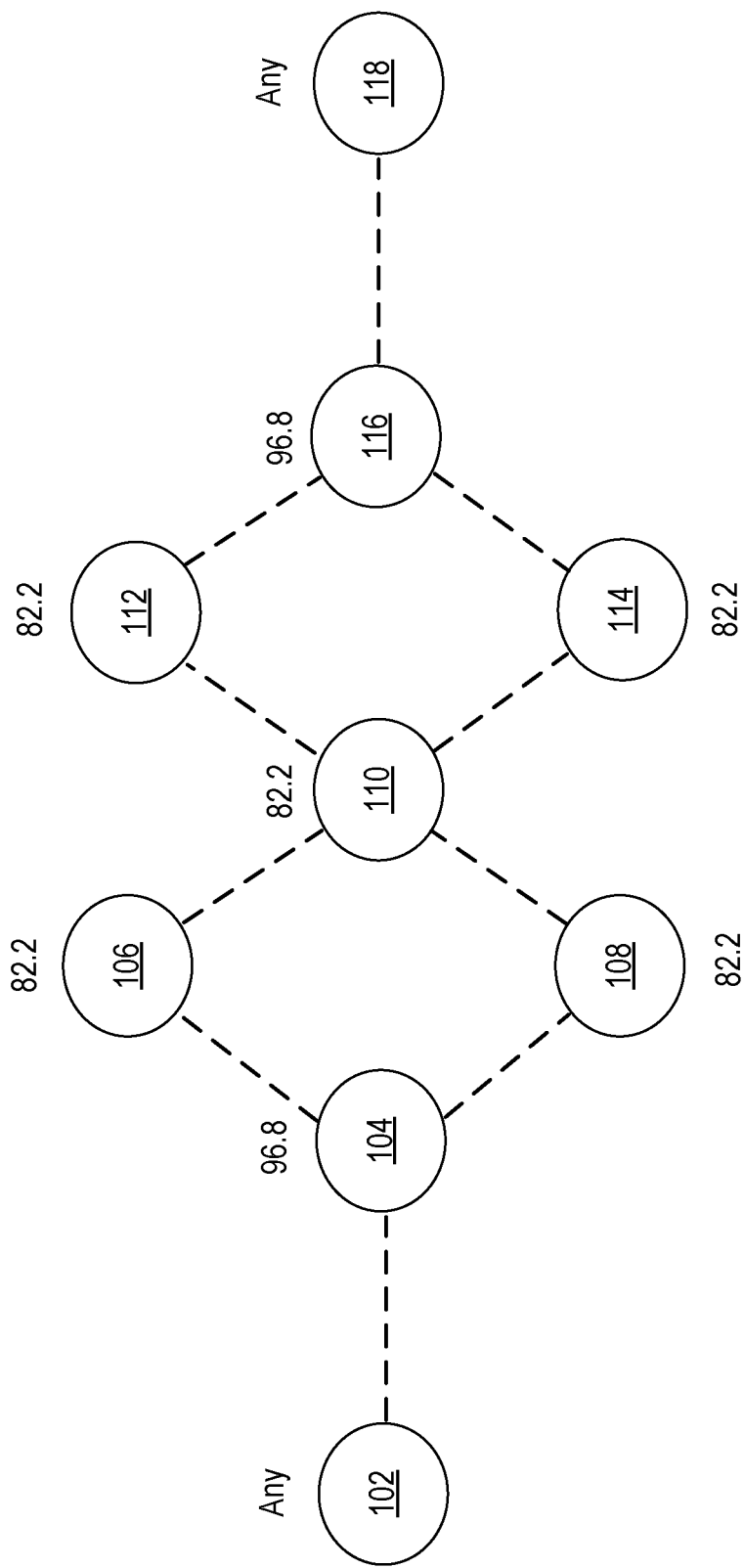
FIG. 8 is a diagram illustrating nodes in a mesh network with adopted duty cycle percentages, according to some embodiments.

FIG. 7 shows the mesh network with dashed lines show connectivity between nodes. Each node determines the duty cycle percentage desired for each neighbor node. The duty cycle percentage may be reduced below 100% to conserve energy. After the duty cycle percentages are shared, each node selects the greatest duty cycle percentage for the purposes of reliability. FIG. 8 shows the adopted duty cycle percentages set by each node, after receiving requested duty cycle percentages from its neighbors.

For example, using the mesh network of FIG. 7, after the neighbor discovery phase, the nodes 102 and 118 know that they have 1 neighbor each, the nodes 106, 108, 112, 114 have 2 neighbors, nodes 104 and 116 have 3 neighbors and node 110 has 4 neighbors around. The nodes 102 and 118 send dead end notifications.

The nodes 104 and 116 receive dead end notifications respectively. After that, the nodes 104 and 116 know that they should consider only 2 neighbors and not 3. All the nodes have fixed number of retransmissions equal to 2. The nodes 102 and 118 require duty cycles of 96.8% from their neighbors, the nodes 106, 108, 112, 114 require 82.2% and the node 110 requires duty cycle 57.8% from its four neighbors. The nodes 104 and 116 require 82.2% because they consider only two neighbors each.

Again, in the embodiment illustrated by FIG. 7, the nodes 102 and 118 receive duty cycle requests of 82.2% from their neighbors; however, any value is allowed according to their configuration. The final duty cycles (in %) in the example are shown in FIG. 8.

Figure 9:
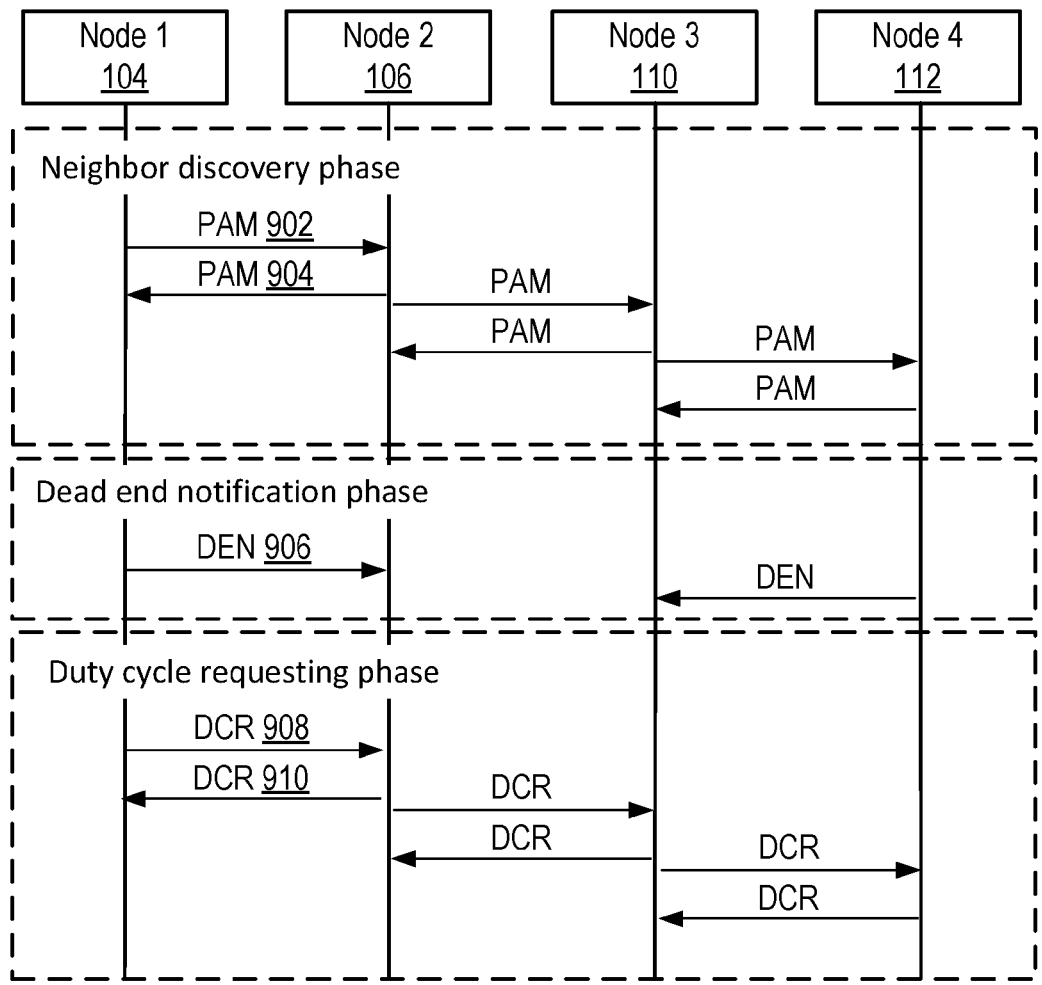
FIG. 9 is a signaling diagram for a network of four nodes in a row, according to some embodiments.

FIG. 9 illustrates a signaling diagram of messages that are sent between the nodes of the mesh network. For example, the nodes may be in a row, such as node 104, 106, 110 and 112. They each send PAM messages 902, 904. The node 104 can send a DEN message 906 because node 102 is a dead end neighbor. The duty cycle requesting phase may involve DCR request messages 908 and 910.

The embodiments described herein provide for extending the battery life of nodes in a mesh network. Duty cycle coordination is performed automatically and requires no prior knowledge about the network topology. This process can be repeated periodically or upon request so that the network adapts to possible changes in its topology. The method does not require time synchronization or exchange of routing information among devices.

Figure 10:
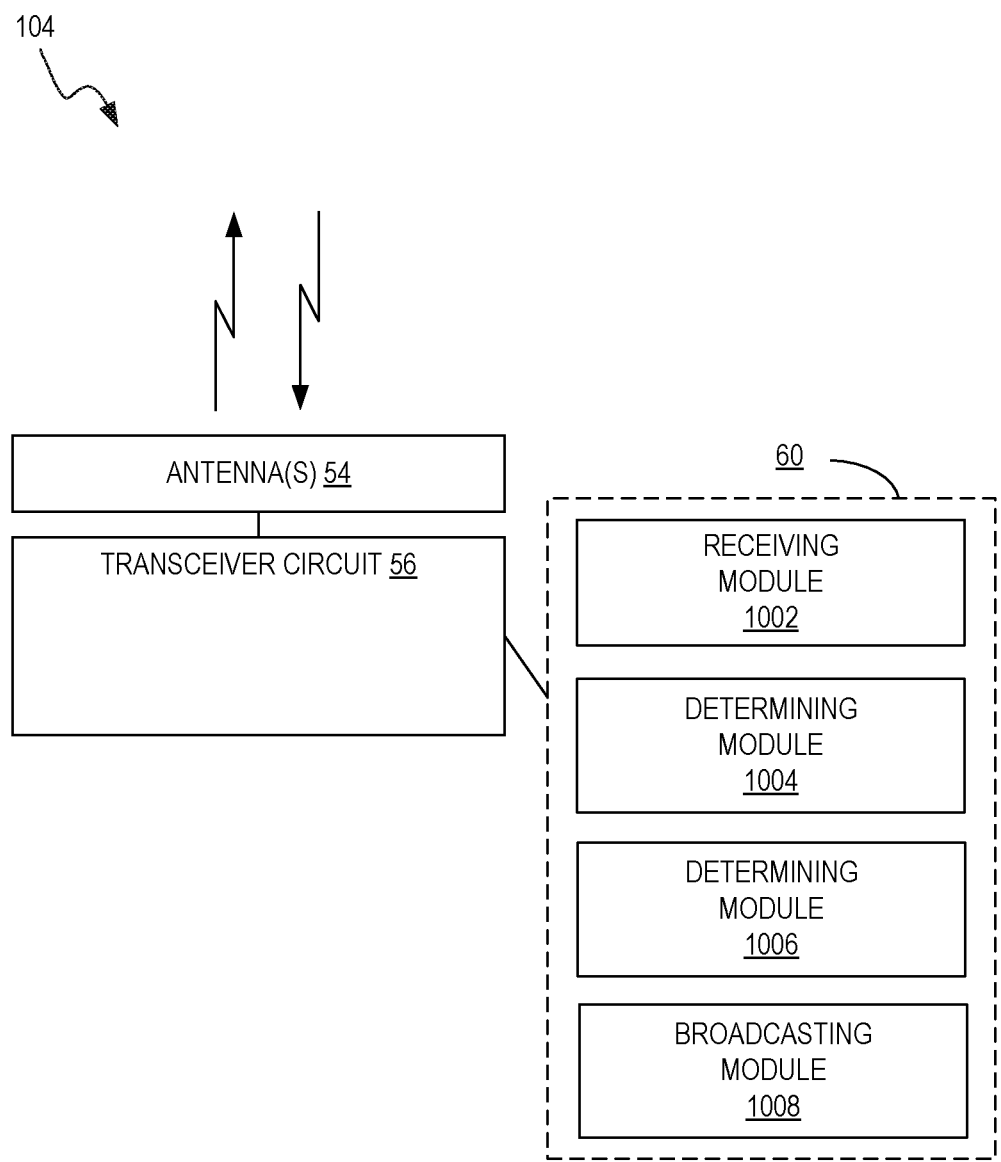
FIG. 10 illustrates a functional implementation of a node for determining duty cycles, according to some embodiments.

FIG. 10 illustrates an example functional module or circuit architecture as may be implemented in the node 104, e.g., based on the duty cycle circuitry 60. The illustrated embodiment at least functionally includes a receiving module 1002 for receiving a presence message from each of one or more neighbor nodes in the mesh network. The embodiment includes a determining module 1004 for determining a number of neighbor nodes, based on the received presence messages and a determining module 1006 for determining a duty cycle percentage to be requested of the neighbor nodes, based on the number of the neighbor nodes, the duty cycle percentage indicating a minimum percentage of time the neighbor nodes should be awake to receive messages, so as to ensure a predetermined probability of successful reception of messages transmitted by the node. The embodiment includes a broadcasting module 1008 for broadcasting the duty cycle percentage for reception by the neighbor nodes.

Figure 11:
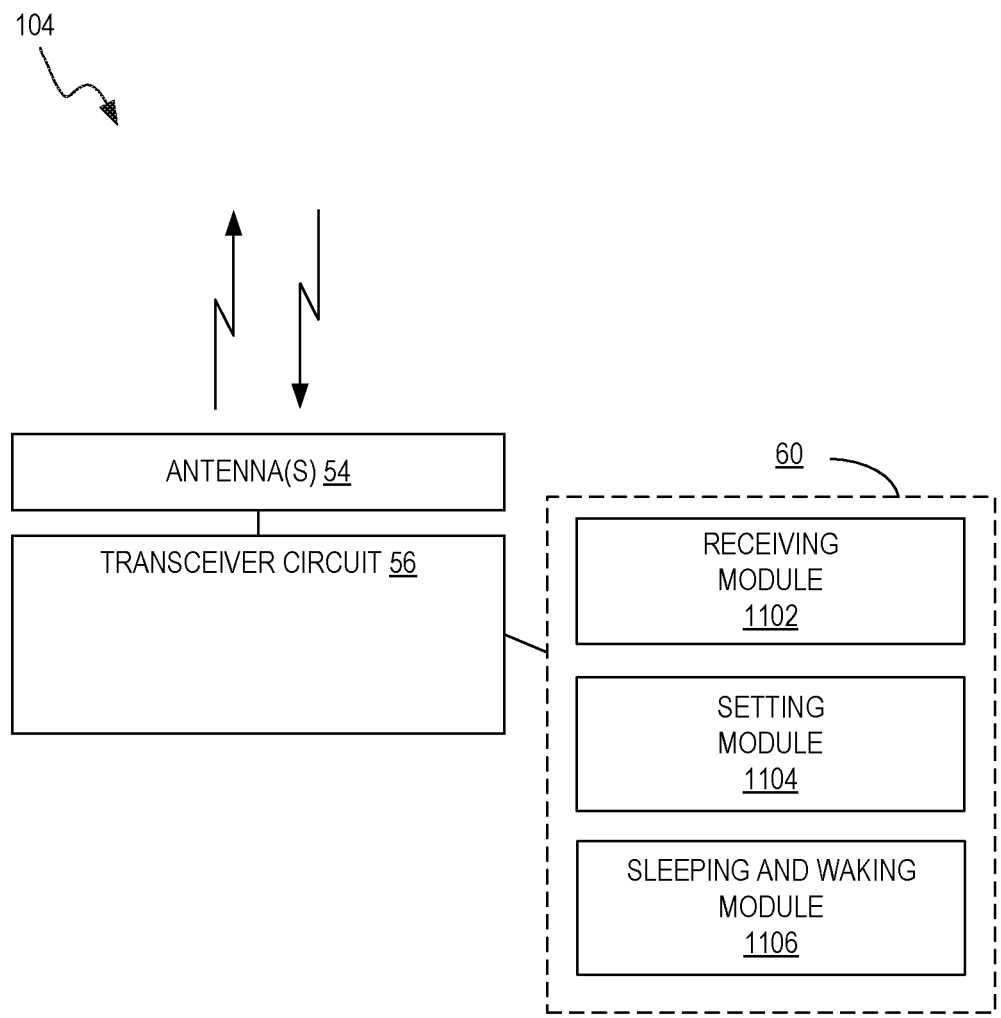
FIG. 11 illustrates a functional implementation of a node for setting duty cycles, according to some embodiments.

FIG. 11 illustrates an example functional module or circuit architecture as may be implemented in the node 104, e.g., based on the duty cycle circuitry 60. The illustrated embodiment at least functionally includes a receiving module 1102 for receiving one or more requested duty cycle percentages from one or more corresponding neighbor nodes. The embodiment includes a setting module 1104 for setting an operating duty cycle of the node based on a greatest duty cycle percentage of the received duty cycle percentages. The embodiment also includes a sleeping and waking module 1106 for sleeping and waking according to the set duty cycle of the node.

Figure 12:
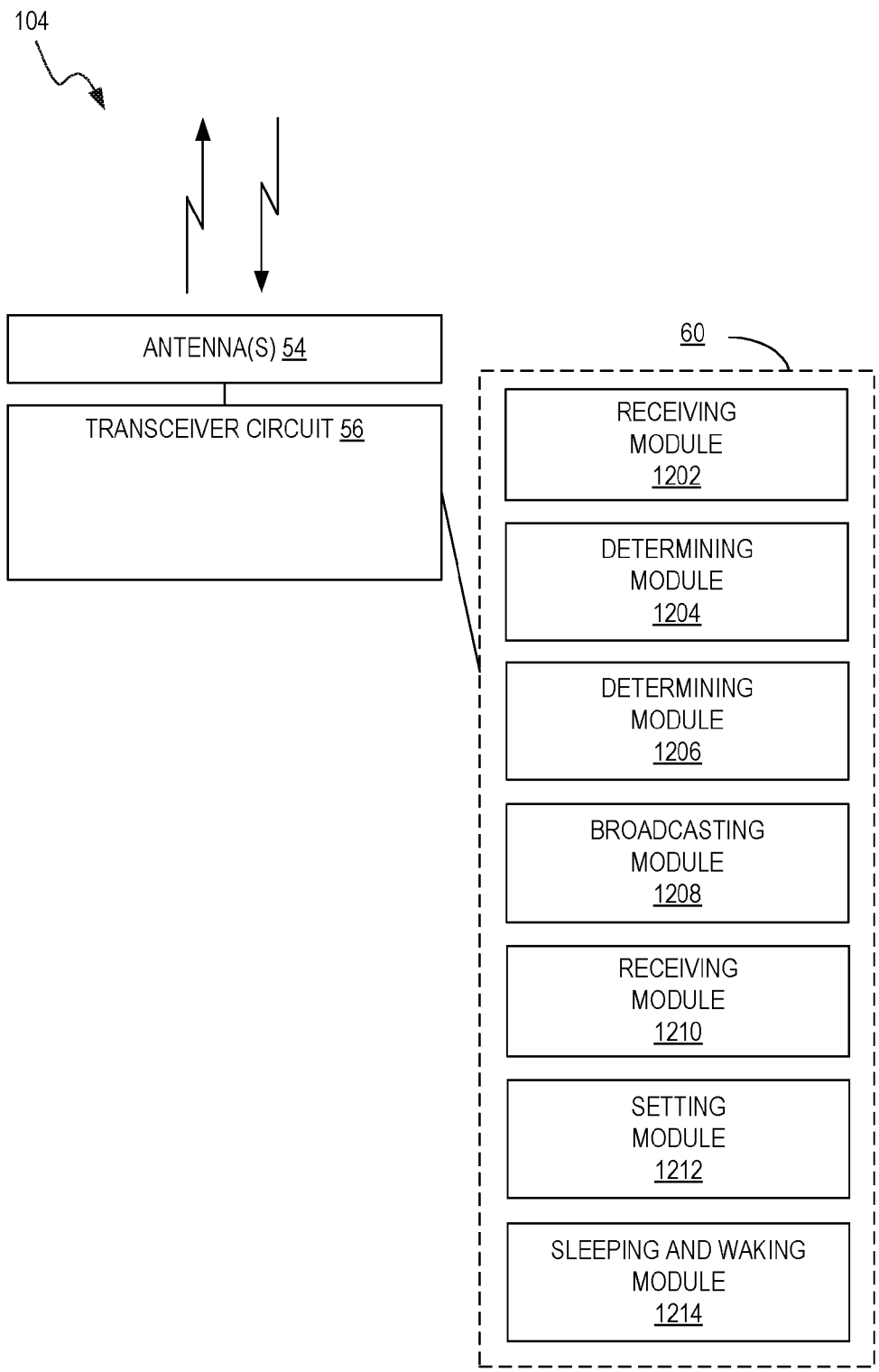
FIG. 12 illustrates a functional implementation of a node for optimizing duty cycles, according to some embodiments.

FIG. 12 illustrates an example functional module or circuit architecture as may be implemented in the node 104, e.g., based on the duty cycle circuitry 60. The illustrated embodiment at least functionally includes a receiving module 1202 for receiving a presence message from each of one or more neighbor nodes in the mesh network. The embodiment includes a determining module 1204 for determining a number of neighbor nodes, based on the received presence messages and a determining module 1206 for determining a duty cycle percentage to be requested of the neighbor nodes, based on the number of the neighbor nodes, the duty cycle percentage indicating a minimum percentage of time the neighbor nodes should be awake to receive messages, so as to ensure a predetermined probability of successful reception of messages transmitted by the node. The embodiment includes a broadcasting module 1208 for broadcasting the duty cycle percentage for reception by the neighbor nodes. The embodiment also includes a receiving module 1210 for receiving one or more requested duty cycle percentages from one or more corresponding neighbor nodes. The embodiment includes a setting module 1212 for setting an operating duty cycle of the node based on a greatest duty cycle percentage of the received duty cycle percentages. The embodiment also includes a sleeping and waking module 1214 for sleeping and waking according to the set duty cycle of the node.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method by a node of a mesh network of wireless devices, the method comprising:
   receiving presence messages from neighbor nodes in the mesh network;
   determining a number of the neighbor nodes, based on the received presence messages;
   determining a duty cycle percentage to be requested of the neighbor nodes, based on the number of the neighbor nodes, the duty cycle percentage indicating a minimum percentage of time the neighbor nodes should be awake to receive messages, so as to ensure a predetermined probability of successful reception of messages transmitted by the node; and
   broadcasting the duty cycle percentage for reception by the neighbor nodes.

2. The method of claim 1, wherein determining the duty cycle percentage is further based on a predetermined number of retransmissions for each message.

3. The method of claim 2, further comprising receiving a dead end message from a neighbor node indicating that the neighbor node cannot forward messages to another node, and wherein determining the number of the neighbor nodes comprises excluding the neighbor node that sent the dead end message from said number of the neighbor nodes.

4. The method of claim 1, further comprising broadcasting the presence of the node to neighbor nodes.

5. The method of claim 4, wherein broadcasting the presence of the node comprises broadcasting the presence using Bluetooth® Low Energy (BLE) protocols on advertising channels.

6. The method of claim 1, further comprising receiving requested duty cycle percentages corresponding to the neighbor nodes and setting an operating duty cycle for the node based on the requested duty cycle percentages.

7. The method of claim 6, further comprising setting an operating duty cycle for the node based on a greatest duty cycle percentage of the requested duty cycle percentages.

8. The method of claim 6, further comprising sleeping and waking according to the set duty cycle of the node.

9. The method of claim 8, further comprising forwarding a message received from a neighbor node according to the set duty cycle of the node.

10. The method of claim 1, further comprising decreasing the duty cycle percentage based on a determination that the number of the neighbor nodes has increased.

11. The method of claim 1, further comprising increasing the duty cycle percentage based on a determination that the number of the neighbor nodes has decreased.

12. The method of claim 1, wherein determining the duty cycle percentage comprises determining the duty cycle percentage D as a function of the number N of the neighbor nodes having equal duty cycle percentages, a number k of the times a message is transmitted and a probability P of successful reception by a target node, wherein the function comprises:

$$D \geq 1 - \sqrt[kN]{1-P}.$$

13. The method of claim 12, further comprising adjusting k in response to a change in N.

14. The method of claim 13, wherein adjusting k comprises increasing k in response to a decrease in N.

15. The method of claim 1, wherein broadcasting the duty cycle percentage comprises broadcasting, with a random delay, a duty cycle request message (DCR) that comprises the duty cycle percentage.

16. The method of claim 1, wherein broadcasting the duty cycle percentage comprises broadcasting during a time period to include all neighbor node duty cycles.

17. The method of claim 1, wherein receiving presence messages comprises receiving presence messages during a time period to include all neighbor node duty cycles.

18. The method of claim 1, wherein receiving presence messages comprises, when a wake time elapses while receiving a presence message, sleeping after reception of the presence message is completed.

19. The method of claim 1, wherein the receiving or broadcasting is performed periodically according to local time information of the node.

20. A method by a node of a mesh network of wireless devices, the method comprising:
   receiving requested duty cycle percentages corresponding to neighbor nodes;
   setting an operating duty cycle of the node based on a greatest duty cycle percentage of the received duty cycle percentages; and
   sleeping and waking according to the set operating duty cycle of the node.

21. The method of claim 20, further comprising forwarding a message received from a neighbor node according to the set operating duty cycle of the node.

22. The method of claim 21, wherein forwarding the message comprises forwarding the message using Bluetooth® Low Energy (BLE) protocols.

23. The method of claim 20, further comprising:
   receiving presence messages from the neighbor nodes in the mesh network;
   determining a number of the neighbor nodes, based on the received presence messages;
   determining a duty cycle percentage to be requested of the neighbor nodes, based on the number of the neighbor nodes, the duty cycle percentage indicating a minimum percentage of time the neighbor nodes should be awake to receive messages, so as to ensure a predetermined probability of successful reception of messages transmitted by the node; and
   broadcasting the duty cycle percentage for reception by the neighbor nodes.

24. The method of claim 23, wherein determining the duty cycle percentage comprises setting a minimum duty cycle percentage that is required to have a probability P that at least one neighbor will receive a forwarded message.

25. A method by a node of a mesh network of wireless devices for spreading information to other nodes in the mesh network according to a duty cycle defined by a duty cycle period that indicates a time interval between consecutive wake instances for the node, and a duty cycle percentage that indicates a percentage of time the node is awake during the duty cycle period, the method comprising:
    receiving presence messages from neighbor nodes in the mesh network;
    determining a number of the neighbor nodes, based on the received presence messages;
    determining a duty cycle percentage to be requested of the neighbor nodes, based on the number of the neighbor nodes, the duty cycle percentage indicating a minimum percentage of time the neighbor nodes should be awake to receive messages, so as to ensure a predetermined probability of successful reception of messages transmitted by the node;
    broadcasting the duty cycle percentage for reception by the neighbor nodes;
    receiving requested duty cycle percentages corresponding to the neighbor nodes;
    setting the duty cycle of the node based on a greatest duty cycle percentage of the received duty cycle percentages; and
    sleeping and waking according to the set duty cycle of the node.

26. A node of a mesh network of wireless devices, comprising:
    a transceiver circuit configured to receive presence messages from neighbor nodes in the mesh network; and
    a processing circuit configured to:
        determine a number of the neighbor nodes, based on the received presence messages;
        determine a duty cycle percentage to be requested of the neighbor nodes, based on the number of the neighbor nodes, the duty cycle percentage indicating a minimum percentage of time the neighbor nodes should be awake to receive messages, so as to ensure a predetermined probability of successful reception of messages transmitted by the node; and
        broadcast, via the transceiver circuit, the duty cycle percentage for reception by the neighbor nodes.

27. A node of a mesh network of wireless devices, comprising:
    a transceiver circuit configured to receive requested duty cycle percentages corresponding to neighbor nodes; and
    a processing circuit configured to:
        set an operating duty cycle of the node based on a greatest duty cycle percentage of the received duty cycle percentages; and
        sleep and wake according to the set operating duty cycle of the node.

28. The node of claim 27, wherein the transceiver circuit is configured to receive presence messages from the neighbor nodes in the mesh network, and wherein the processing circuit is configured to:
    determine a number of the neighbor nodes, based on the received presence messages;
    determine a duty cycle percentage to be requested of the neighbor nodes, based on the number of the neighbor nodes, the duty cycle percentage indicating a minimum percentage of time the neighbor nodes should be awake to receive messages, so as to ensure a predetermined probability of successful reception of messages transmitted by the node; and
    broadcast, via the transceiver circuit, the duty cycle percentage for reception by the neighbor nodes.

* * * * *